United States Patent [19]
Tolliver

[11] 3,826,287
[45] July 30, 1974

[54] CONCRETE PIPE REINFORCING CAGE

[75] Inventor: Wilbur E. Tolliver, Holland, Mich.

[73] Assignee: New York Wire Mills, Tonawanda, N.Y.

[22] Filed: Feb. 8, 1973

[21] Appl. No.: 330,608

[52] U.S. Cl. ............................................. 138/175
[51] Int. Cl. ............................................ F16l 9/08
[58] Field of Search .................. 138/175, 177, 178; 140/3 C

[56] References Cited
UNITED STATES PATENTS

| 696,838 | 4/1902 | Parmley | 138/175 X |
| 1,332,387 | 3/1920 | Easterday | 138/175 |
| 3,419,047 | 12/1968 | Osweiler | 138/175 |

FOREIGN PATENTS OR APPLICATIONS

| 5,297 | 1/1901 | Great Britain | 138/175 |

*Primary Examiner*—Jerry W. Myracle
*Attorney, Agent, or Firm*—Price, Heneveld, Huizenga & Cooper

[57] ABSTRACT

A cage for reinforcing concrete pipe made by positioning two reinforcing fabric segments at the crown and invert reinforcing portions of the cage respectively and two fabric segments at the opposed spring line reinforcing segments of the cage respectively. Each of the segments if formed on a generally circular radius, the crown and invert reinforcing segments being formed on an inner radius so as to be located generally near the inner wall of the completed pipe and the spring line reinforcing segments being formed on a larger radius so as to be generally adjacent the outer wall of the pipe. In one embodiment, the four segments are joined together by two spaced hoops, the crown and invert reinforcing segments being joined directly to the hoops and the spring line reinforcing segments being joined to the hoops by spacer rods. In another embodiment, the four segments are part of an integral piece of reinforcing fabric bent outwardly at the edges of the crown and invert reinforcing segments to define spacer segments, the spacer segments terminating and being bent inwardly at the edges of the spring line reinforcing segments.

13 Claims, 4 Drawing Figures

CONCRETE PIPE REINFORCING CAGE

BACKGROUND OF THE INVENTION

The present invention relates to concrete pipe and reinforcing cages therefor. Pipe is conventionally constructed by casting concrete around a reinforcing cage body. The cage body is formed of a piece of wire fabric, the wire fabric comprising a network of interconnected strands of wire.

It is particularly necessary to reinforce the pipe at the crown and invert and at the spring lines thereof. The crown is an imaginary line intersecting the vertical axis of a lateral cross section of a pipe at the top of the pipe. The invert is a line intersecting the same vertical axis at the bottom of the pipe. The spring lines are imaginary lines intersecting the horizontal axis of a lateral cross section of the pipe at the sides of the pipe.

At the crown and invert, reinforcement is necessary generally at the inner wall of the pipe. This is because the forces of dirt piled on top of the pipe create forces of tension generally at the inner wall of the pipe at the crown and invert. While concrete is very resistant to forces of compression, it tends to disintegrate under forces of tension unless reinforced by wire fabric. At the spring lines, it is necessary to reinforce the pipe generally near the outer wall thereof. The dirt piled on top of the pipe tends to collapse the top towards the bottom, thereby tending to push the sides outwardly. This creates forces of tension at the outer wall of the pipe along the spring line thereof. (While technically the spring line is located at the inner wall of the pipe, the term is used somewhat loosely in the industry and can be considered to refer to any longitudinal line intersecting the horizontal axis of a lateral cross section of the pipe at any point within the thickness of the pipe. The same can be said of the crown and invert.) Thus, at the crown and invert, the fabric reinforcement should be located generally near the inner wall of the pipe while at the spring lines, the reinforcement should be located generally near the outer wall of the pipe.

In smaller diameter pipe, manufacturers can use a single circular cage for purposes of reinforcing the pipe both at the crown and invert, and at the spring lines. The pipe is sufficiently thin in wall thickness that the circular cage can be located generally centrally in the wall section and will adequately serve to reinforce the outer wall at the spring lines and the inner wall at the crown and invert.

In medium and larger sized pipes, however, the fabric must be located closer to the outer wall at the spring lines and closer to the inner wall at the crown and invert. In some instances, this can be achieved by forming a cage which is elliptical in configuration. The ellipse is oriented such that it comes closest to the inner wall at the crown and invert and closest to the outer wall at the spring lines. The disadvantage of employing such an elliptical cage is that it diverges too quickly from the wall it is to reinforce. It would be preferable for the reinforcing fabric to follow the same arc of curvature as the wall which it reinforces.

In order to achieve this result, manufacturers sometimes employ two spaced concentric cages, one inside the other. This arrangement is particularly popular in the largest varieties of pipe or in medium sized pipe which must be particularly strong. The two cages may both be circular, or the inner one may be circular and the outer one elliptical with its major axis corresponding to the horizontal axis of a lateral cross section of the pipe. When both cages are circular, they provide fabric reinforcement at the crown and invert which follows the same curvature as does the inner wall. Similarly, the outer cage follows the same curvature as does the outer wall at the spring lines. While the arrangement of inner and outer cages results in a stronger pipe, it is a more costly construction than is a single elliptical cage. Wherever possible, manufacturers try to utilize the less expensive elliptical cage.

These approaches to pipe reinforcing have been employed in this industry for many years. While various additional reinforcing implements have been added from time to time, the basic approach to cage reinforcement outlined above has been employed by the industry for 75 years.

SUMMARY OF THE INVENTION

The present invention is a cage which locates reinforcing fabric only where it is needed most, on generally the same curvature as the wall it is to reinforce, near the inner wall at the crown and invert and near the outer wall at the spring lines. Yet, this result is achieved with a single cage, rather than with concentric inner and outer cages. The single cage of this invention is not only less expensive than two concentric cages, but it is also less expensive, or at most approximately equal to, the cost of a single elliptical cage.

Basically, the cage of the present invention comprises four segments of reinforcing fabric. The first and second segments are located at the crown and invert reinforcing areas of the cage respectively, and the third and fourth segments are located at the opposing spring lines reinforcing sides of the cage. The first and second segments are formed to generally the same curvature of the inner wall such that they will lie generally adjacent the inner wall of the pipe to be formed. The third and fourth segments are formed to generally the same curvature of the outer wall, spaced outwardly from the general radius of the first and second segments, such that they will lie generally adjacent the outer wall of the pipe to be reinforced. The first, second, third and fourth segments are joined together by joining means to thereby define an integral cage construction.

Preferably, the first and second segments are joined to a pair of hoops, one hoop being located at each end of the cage. The third and fourth segments are also joined to the hoops, but by spacer means extending from the hoops to the third and fourth segments. The individual segments can be made to subtend any desired arc, and there will be only a minimum amount of steel at points other than on the reinforcing arcs.

However, in the broader aspects of the invention, the specific construction of the cage could be somewhat different. In one embodiment, the four segments referred to above are an integral part of an integral piece of fabric bent outwardly at the ends of the first and second segments to define spacer segments, the spacer segments terminating and being bent inwardly again at the edges of the third and fourth segments, respectively.

These and other features, objects and advantages of the invention will be more fully understood and appreciated by reference to the written specification and appended drawings.

PREFERRED EMBODIMENT

Figure 1:
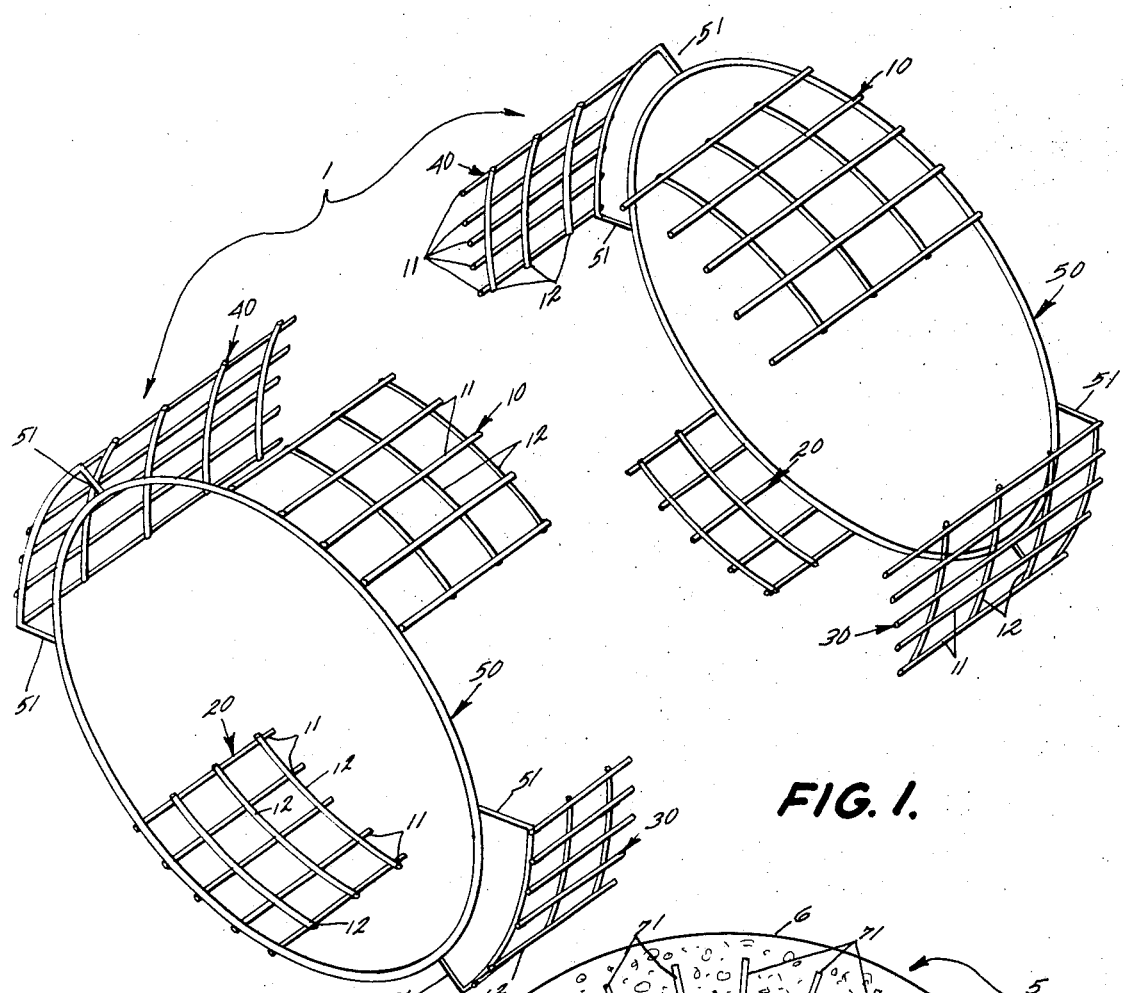
FIG. 1 is a perspective view of a cage made in accordance with the present invention, the central portion of the cage being broken away so as to minimize confusing line interference.

In the preferred embodiment, cage body 1 includes four fabric segments, 10, 20, 30 and 40 located respectively at the crown, invert and spring line reinforcing portions of the cage. Segments 10 and 20 are formed on an inner generally circular radius such that they will lie near the inner wall 5a of pipe 5 after it is formed and will follow generally the same curvature (pipe 5 being circular in cross section). Spring line reinforcing segments 30 and 40 are formed on a larger generally circular radius so that they will lie near outer wall 5b of pipe 5 and will follow generally the same curvature as outer wall 5b. Crown segment 10 and invert segment 20 are joined directly to a pair of spaced circular hoops 50. Spring line segments 30 and 40 are joined to, but spaced from, hoops 50 by means of spacer rods 51.

Each of the fabric reinforcing segments 10, 20, 30 and 40 comprises a plurality of longitudinal wire strands 11 joined to a plurality of lateral wire strands 12. Longitudinal strands 11 are so denominated because they extend generally parallel to the longitudinal axis of cage body 1 and of pipe 5. Lateral strands 12 extend laterally thereof. In essence, lateral strands 12 correspond to the circumferential strands of a circular or elliptical cage. Longitudinal and lateral strands 11 and 12 are joined together in a conventional manner, as for example by welding.

Each of the fabric reinforcing segments 10, 20, 30 and 40 is formed so as to have an arc of curvature corresponding to the curvature of the particular wall of pipe 5 which it is to reinforce. In the pipe shown in FIG. 2, all of the segments are formed on a generally circular radius, since the pipe shown is generally circular. However, it would be possible to use this invention in an elliptical pipe, or in a pipe whose inner and outer walls had differing curvatures. In such a situation, the curvature given to a particular reinforcing segment would correspond to the curvature of its adjacent wall. In the case of crown segment 10, it would be given a curvature corresponding to the curvature of the inner wall 5a of pipe 5 at the crown thereof. The curvature of invert segment 20 would correspond to the curvature of the inner wall 5a of pipe 5 at the invert thereof. The curvature of spring line segments 30 and 40 would correspond to the curvature of outer wall 5b at the respective spring lines of pipe 5. Typically, however, these curvatures will follow a particular generally circular radius.

Hoops 50 each comprise a single strand of wire bent into a hoop, the ends of the wire being welded together. Several such hoops can be employed along the length of the cage if necessary. Crown segment 10 and invert segment 20 are welded to hoops 50, the ends of their longitudinal wires 11 being welded to hoops 50. In manufacturing, segments 10 and 20 could be welded together and welded to continuous lengths of wire 50 at the same time. The continuous lengths might then be cut to a proper circumferential length and formed into a cylinder, the ends being welded together. Spacer rods 51 constitute short lengths of wire, each being welded at one end to a particular hoop 50 and extending generally radially outwardly therefrom. At the other end, spacer rods 51 are welded to either spring line segment 30 or spring line segment 40. It would be possible to form spacer rods 51 integrally with a lateral wire 12 of the segments. The specific manner in which spacer rods 51 are formed is not critical to the practice of this invention.

Figure 2:
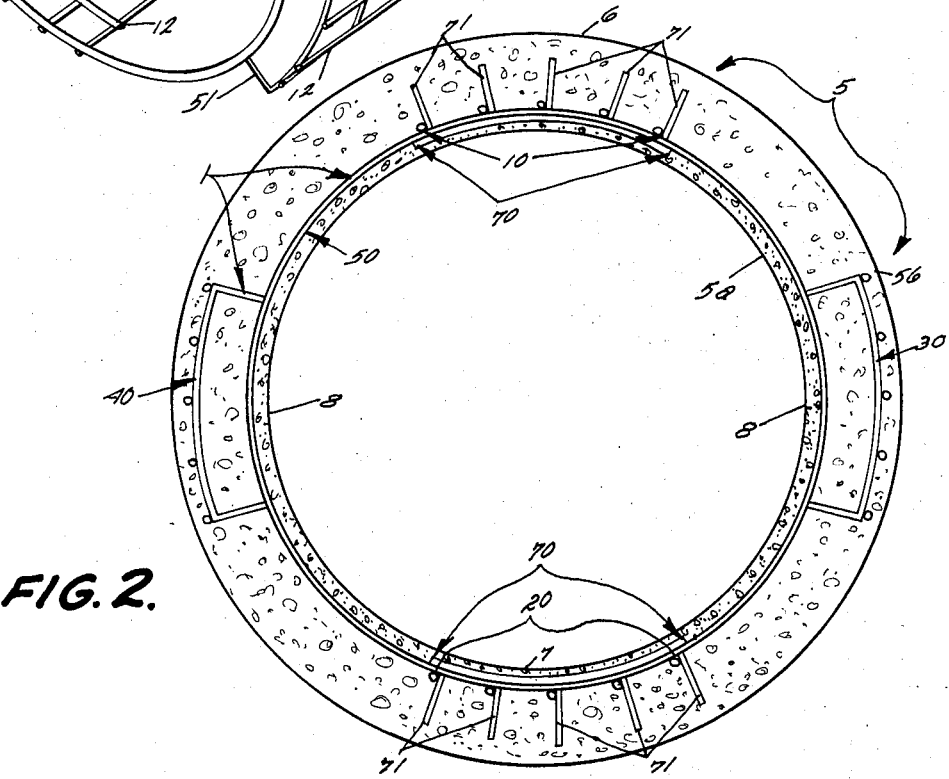
FIG. 2 is a cross-sectional view of a pipe formed around the cage of FIG. 1, with additional mat reinforcement being located at the crown and invert of the pipe.

In the concrete pipe as shown in FIG. 2, the cage body 1 of FIG. 1 is additionally reinforced at the crown and invert thereof by reinforcing mats 70. Each mat 70 comprises a network of welded wire strands with a plurality of stirrup projections 71 extending outwardly therefrom. Such mats are more thoroughly described in my copending application entitled "STIRRUP FABRIC AND METHOD FOR FORMING PIPE REINFORCEMENT," Ser. No. 300,114, filed on Oct. 24, 1972. Basically, the mat 70 is placed to the inside of cage body 1 at the crown or invert thereof and projections 71 are pushed through the openings in either crown reinforcing segment 10 or invert reinforcing segment 20 so that they project generally radially outwardly from cage 1. Cage 1 is placed in an appropriate form and concrete is cast therearound so as to form pipe 5. Alternatively, hinged or conventional stirrups could be joined directly to segments 10 and 20. Ordinary fabric mats could be added over the stirrups if necessary for additional reinforcement. Such arrangements could also be made at the spring line segments 30 and 40, if desired.

Figure 3:
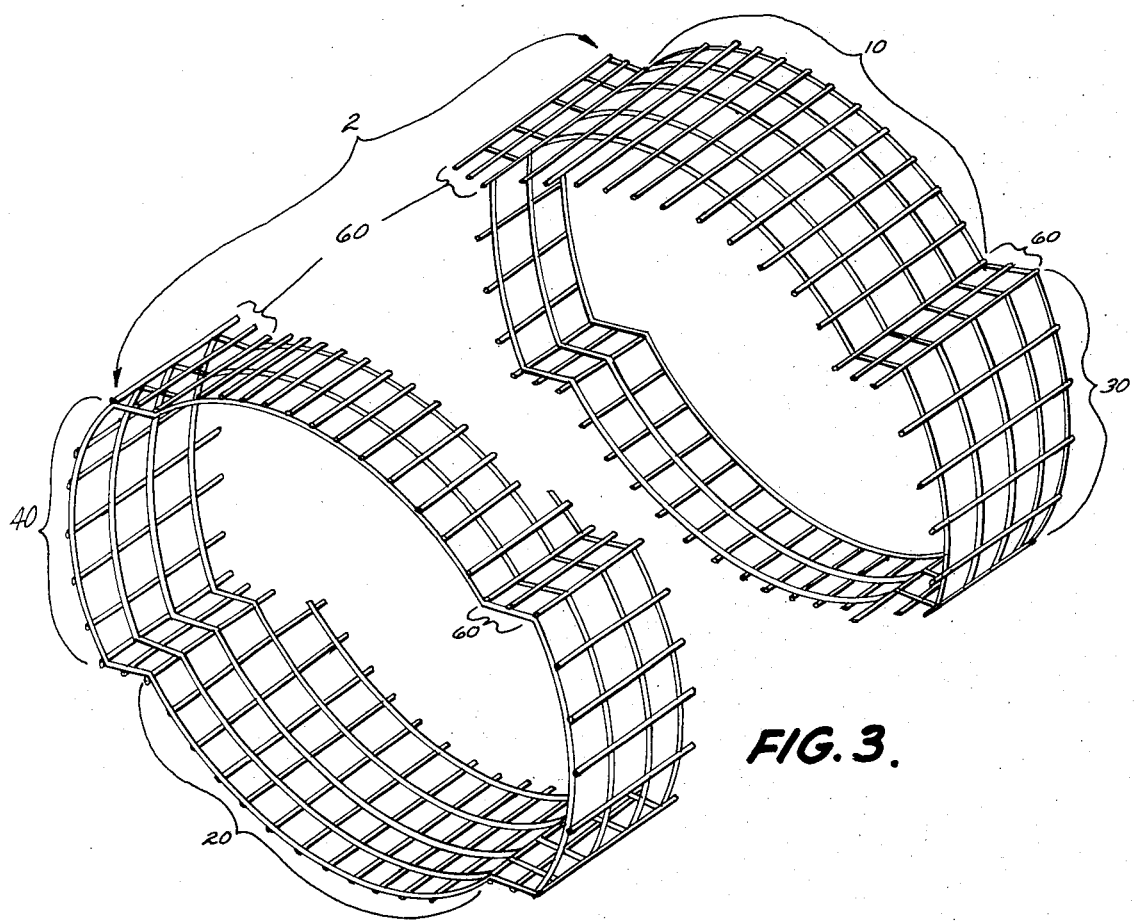
FIG. 3 is a perspective view of an alternative embodiment cage, the central portion thereof being broken away.
Figure 4:
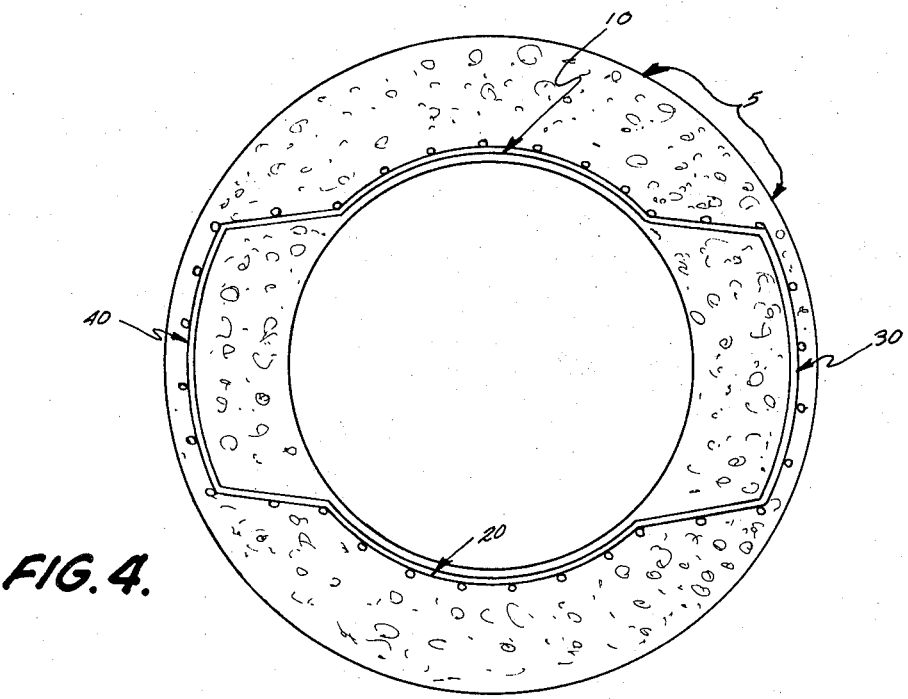
FIG. 4 is a cross-sectional view of a pipe formed around the cage of FIG. 3.

The alternative embodiment cage 2 which is shown in FIG. 3 is identical in the broader aspects of the invention to the cage shown in FIG. 1. As with the cage shown in FIG. 1, it includes a crown reinforcing segment 10, and invert reinforcing segment 20 and spring line reinforcing segments 30 and 40. The key difference is that the segments 10, 20, 30 and 40 of cage 2 comprise integral portions of a single integral length of reinforcing fabric formed into generally the configuration of the pipe to be manufactured and then crimped at the edges of the crown and invert reinforcing segments 10 and 20, respectively. In essence, the fabric is bent at the edges of the crown and invert reinforcing segments 10 and 20, respectively, to define generally radially outwardly projecting spacer segments 60. Spacer segments 60 terminate and are bent inwardly at the edges of spring line reinforcing segments 30 and 40, respectively. While in FIG. 4, cage 2 is not supplementally reinforced with reinforcing mats 70, it does operate in basically the same way as cage 1 to reinforce its pipe 5. Because it is integrally formed of an integral length of fabric, the need for separate hoops 50 and spacer rods 51 is eliminated.

In either embodiment, the cage constitutes a single integral cage which places fabric adjacent the inner wall of the crown and invert and adjacent the outer walls of the spring lines, the fabric at the crown, invert and spring lines following generally the same curvature as the adjacent wall which it is reinforcing. In cage 1, the cage is made integral by the employment of hoops 50 and spacer rods 51. In cage 2, the cage is made integral by being formed out of an integral length of reinforcing fabric. Hitherto, manufacturers have been able to achieve this result only by employing spaced inner and outer cages, typically both cages being circular to correspond to the circular configuration of the pipe. Now, the same result is achieved with a single cage which is less expensive than spaced inner and outer cages and which, particularly in the FIG. 1 embodiment, may be less expensive than a single elliptical cage.

Of course, it is understood that the above is merely a preferred embodiment of the invention and that various changes and alterations may be made thereof without departing from the spirit and broader aspects of the invention.

The embodiments of the invention in which an exclusive property or privilege is claimed are defined as follows.

1. A concrete pipe or the like having generally curvilinear inner and outer walls and having a crown invert and spring lines and being reinforced by a wire fabric cage, said cage comprising: first and second segments of reinforcing fabric located at the crown and invert reinforcing areas of the cage respectively; said first and second segments having a curvature conforming generally to the curvature of the inner wall of said pipe at the crown and invert of the pipe respectively; said first and second segments being spaced from the center of the cage a distance such that they lie generally adjacent the inner wall of said pipe; third and fourth segments of reinforcing fabric located at the spring line reinforcing sides of the cage respectively; said third and fourth segments having a curvature conforming generally to the curvature of the outer wall of said pipe at said spring lines thereof respectively; said third and fourth segments being spaced from the center of said cage a distance such that they lie generally adjacent the outer wall of the pipe to be reinforced; means joining said first, second, third and fourth segments together so that they define an integral reinforcing cage; said first and second segments being formed on a first generally circular radius and said third and fourth segments being formed on a second generally circular radius, said second radius being greater than said first radius.

2. The pipe of claim 1 in which said first and second segments are joined to at least a pair of spaced hoops; spacer means extending generally outwardly from said hoops in the proximities of said third and fourth segments, said third and fourth segments being joined to said spacer means.

3. The pipe of claim 2 in which said spacer means comprise two spaced rods projecting outwardly from each of said hoops in the proximity of each of said third and fourth reinforcing segments.

4. The pipe of claim 3 in which one of said hoops is located at one end of said segments, the other of said hoops being located at the other end of said segments; each of said spacer rods joining its respective third or fourth segment at a corner thereof.

5. The pipe of claim 4 in which each of said segments spans an arc of between 40° to 90°.

6. The pipe of claim 1 in which said first, second, third and fourth fabric reinforcing segments comprise part of an integral piece of fabric bent outwardly at the ends of said first and second segments, respectively, to define four spacer segments, each of spacer segments terminating and being bent over at the edges of said third and fourth segments, respectively.

7. The pipe of claim 6 in which each of said segments spans an arc of between 40° and 90°.

8. A concrete pipe or the like having a crown, invert and spring lines and being reinforced by a cage, said cage comprising: first and second segments of reinforcing fabric located at the crown and invert reinforcing areas of the cage respectively; said first and second segments having a curvature conforming generally to the curvature of the inner wall of said pipe at the crown and invert of the pipe respectively; said first and second segments being spaced from the center of the cage a distance such that they lie generally adjacent the inner wall of said pipe; third and fourth segments of reinforcing fabric located at the opposite spring line reinforcing sides of the cage respectively; said third and fourth segments having a curvature conforming generally to the curvature of the outer wall of said pipe at said spring lines thereof respectively; said third and fourth segments being spaced from the center of said cage a distance such that they lie generally adjacent the outer wall of the pipe to be reinforced; said first and second segments being joined to at least a pair of spaced hoops; spacer means extending generally outwardly from said hoops in the proximities of said third and fourth segments, said third and fourth segments being joined to said spacer means.

9. The pipe of claim 8 in which said spacer means comprise two spaced rods projecting outwardly from each of said hoops in the proximity of each of said third and fourth reinforcing segments.

10. The pipe of claim 9 in which one of said hoops is located at one end of said segments, the other of said hoops being located at the other end of said segments; each of said spacer rods joining its respective third or fourth segment at a corner thereof.

11. The pipe of claim 10 in which each of said segments spans an arc of between 40° and 90°.

12. A concrete pipe or the like having a crown, invert and spring lines and being reinforced by a cage, said cage comprising: first and second segments of reinforcing fabric located at the crown and invert reinforcing areas of the cage respectively; said first and second segments having a curvature conforming generally to the curvature of the inner wall of said pipe at the crown and invert of the pipe respectively; said first and second segments being spaced from the center of the cage a distance such that they lie generally adjacent the inner wall of said pipe; third and fourth segments of reinforcing fabric located at the opposite spring line reinforcing sides of the cage respectively; said third and fourth segments having a curvature conforming generally to the curvature of the outer wall of said pipe at said spring lines thereof respectively; said third and fourth segments being spaced from the center of said cage a distance such that they lie generally adjacent the outer wall of the pipe to be reinforced; said first, second, third and fourth fabric reinforcing segments comprising part of an integral piece of fabric bent outwardly at the ends of said first and second segments, respectively, to define four spacer segments, each of spacer segments terminating and being bent over at the edges of said third and fourth segments, respectively.

13. The pipe of claim 12 in which each of said segments spans an arc of between 40° to 90°.

* * * * *